United States Patent [19]

Lee et al.

[11] 4,353,078

[45] Oct. 5, 1982

[54] INK JET PRINT HEAD HAVING DYNAMIC IMPEDANCE ADJUSTMENT

[75] Inventors: Francis C. Lee, San Jose; Ross N. Mills, Morgan Hill; Frank E. Talke, Morgan Hill, all of Calif.

[73] Assignee: International Business Machines Corporation, Armonk, N.Y.

[21] Appl. No.: 78,410

[22] Filed: Sep. 24, 1979

[51] Int. Cl.[3] .............................................. G01D 15/18

[52] U.S. Cl. .............................................. 346/140 R

[58] Field of Search .............................. 346/140, 75

[56] References Cited

U.S. PATENT DOCUMENTS

| | | | |
|---|---|---|---|
| 3,832,579 | 8/1974 | Arndt | 346/140 X |
| 3,848,118 | 11/1974 | Rittberg | 346/140 X |
| 3,852,773 | 12/1974 | Sicking | 346/140 |
| 3,940,773 | 2/1976 | Mizoguchi | 346/140 R |
| 3,946,398 | 3/1976 | Kyser | 346/140 X |
| 3,988,745 | 10/1976 | Sultan | 346/140 |
| 4,131,899 | 12/1978 | Christon | 346/140 X |
| 4,215,354 | 7/1980 | Larsson | 346/140 R |

OTHER PUBLICATIONS

Denny et al.; Diaphragm Ink Drop Generator and Liquid Horn; IBM TDB, vol. 16, No. 3, Aug. 1973, pp. 789-791.

Lee et al.; High-Speed Droplet Generator; IBM Tech. Disc. Bulletin; vol. 15, No. 3, Aug. 1972, p. 909.

Meier, J. H.; Ink Jet Head; IBM Tech. Disc. Bulletin; vol. 16, No. 6, Nov. 1973, p. 1833.

*Primary Examiner*—Joseph W. Hartary
*Attorney, Agent, or Firm*—Otto Schmid, Jr.

[57] ABSTRACT

A drop-on-demand ink jet printing apparatus in which the print head has an ink cavity which is filled with ink, and which has an orifice designed so that ink does not flow out under static conditions. A fluid inlet chamber is provided to receive ink from the ink supply and this chamber is separated from the ink cavity by a narrow gap. An electromechanical transducer is mounted adjacent the ink cavity and the inlet chamber. The transducer is selectively energized in response to the print data signals so that, when energized by an electrical signal, the transducer reduces the volume in the ink cavity to eject one ink drop from the orifice and substantially close off the narrow gap to substantially close the flow path from the ink cavity to the inlet chamber during the formation of the drop of ink.

9 Claims, 6 Drawing Figures

INK JET PRINT HEAD HAVING DYNAMIC IMPEDANCE ADJUSTMENT

BACKGROUND OF THE INVENTION

This invention relates to an ink jet print head and more particularly to an ink jet print head for generating ink drop on demand under control of a suitable electrical signal.

Ink jet printing has been known in the prior art, including systems which use a pressure generated continuous stream of ink, which is broken into individual drops by a continuously energized transducer. The individual drops are selectively charged and deflected either to the print medium for printing or to a sump where the drops are collected and recirculated. Examples of these pressurized systems include U.S. Pat. No. 3,596,275 to Sweet, and U.S. Pat. No. 3,373,437 to Sweet et al. There have also been known in the prior art ink jet printing systems in which a transducer is used to generate ink drops on demand. One example of such a system is commonly assigned U.S. Pat. No. 3,787,884 to Demer. In this system the ink is supplied to a cavity by gravity flow and a transducer mounted in the back of the cavity produces motion when energized by an appropriate voltage pulse, which results in the generation of an ink drop. A different embodiment of a drop-on-demand system in which the transducer is radially arranged is shown in U.S. Pat. No. 3,683,212 to Zoltan.

The prior art drop-on-demand printing systems have been limited by low drop production rate, by a low efficiency and by a jet instability which produced drops with irregular spacing and/or size which lead to poor print quality as the drop rate was increased. One reason for the low drop production rate in prior art drop-on-demand printing systems is the time required to replenish the ink after ejection of a drop, and a second reason is that, to prevent unwanted ink drop satellite formation, complete damping of the internal fluid oscillations within the ink must be attained before drop ejection can be repeated. A basic reason for the low efficiency of prior art drop-on-demand printing systems is that, during the operational cycle of a drop-on-demand print head, ink is moved not only in the downstream direction toward the nozzle, but also in the upstream direction toward the ink supply. If the impedance in the upstream supply line is much smaller than that in the nozzle, most of the kinetic energy generated in the head is used to accelerate the ink toward the ink supply and only a small fraction of the generated kinetic energy is used to eject droplets out of the nozzle. If the impedance of the upstream supply line is made much higher than that of the nozzle, then ink cannot be resupplied fast enough to the ink cavity, and the drop-on-demand print head will not operate properly. To avoid either of the limiting cases, the impedance of the upstream and downstream fluid line has been generally chosen to be of the same order of magnitude. This implies that the efficiency of the prior art drop-on-demand print heads is substantially below optimum efficiency.

SUMMARY OF THE INVENTION

It is therefore the object of this invention to produce an improved drop-on-demand printing system having a higher production rate of ink drops having uniform size and spacing.

It is another object of this invention to produce an improved drop-on-demand printing system in which the impedance of the upstream supply line is varied dynamically during a drop ejection cycle.

These and other objects are accomplished according to the present invention by a drop-on-demand ink jet printing apparatus which provides a print head having a fluid chamber supplied with fluid ink. An orifice is in fluid communication with the fluid chamber and a relatively narrow passageway separates the fluid chamber from a fluid inlet chamber. An electromechanical transducer is mounted adjacent the fluid chamber and the fluid inlet chamber. Selective operation of the printing apparatus is provided by energizing the transducer in response to an electrical signal to reduce the volume in the fluid chamber and substantially close the narrow passageway to force a single drop of ink from the orifice and to substantially close the flow path from the fluid chamber to the fluid inlet chamber during formation of the drop of ink.

In a specific embodiment described, the fluid inlet chamber comprises a shallow radial trough surrounding the fluid chamber. In another embodiment, the fluid chamber is elongated and the fluid inlet chamber is formed by a cross-wall member extending across the fluid chamber. In a further embodiment, the transducer means is an elongated cylindrical member with the fluid chamber forward within the transducer means and the relatively narrow passageway formed by a fixed cylindrical member positioned radially of the transducer means.

DESCRIPTION OF THE PREFERRED EMBODIMENTS

Figure 1:
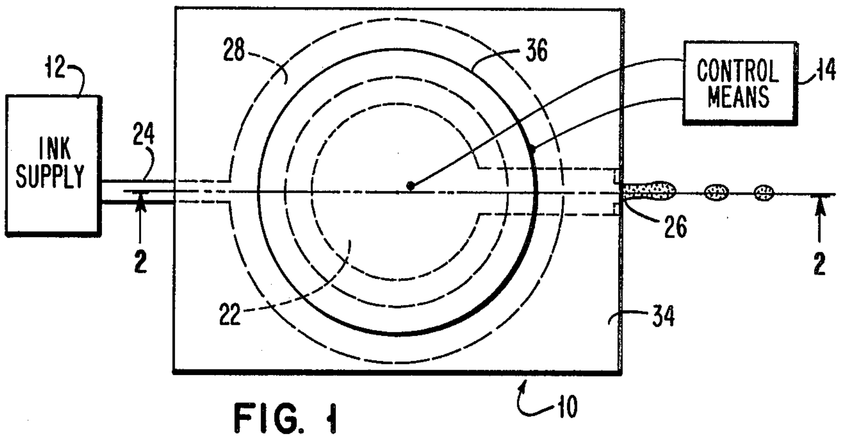
FIG. 1 is a drop-on-demand ink jet printer embodying the invention.

Referring to FIG. 1, the printer apparatus comprises a print head 10 to which is supplied liquid ink from ink supply means 12. Control means 14 provides the voltage control pulses to selectively energize print head 10 to produce on ink drop for each voltage pulse supplied to print head 10. Print head 10 comprises head body 20 having a chamber or cavity 22 formed therein. Cavity 22 is maintained filled with ink through supply line 24 from ink supply means 12. Ink from supply means 12 is not pressurized so the ink in cavity 22 is maintained at or near atmospheric pressure under static conditions. An exit from cavity 22 is provided by nozzle portion 26 which is designed so that the ink does not flow out of nozzle portion 26 under static conditions. An intermediate ink reservoir 28 is formed in head body 20 and is separated from cavity 22 by internal wall portion 30. The top of cavity 22 as shown in FIG. 1 is closed by a suitable transducer means, which is fixed to the head body. Internal wall portion 30 is designed so that a narrow passageway 32 is provided for the transfer of liquid ink from intermediate ink reservoir 28 to ink cavity 22 The transducer means comprises a membrane member 34 which is fastened to an electromechanical tranasducer 36. Transducer 36 contracts radially when energized with a suitable voltage pulse and bends membrane 34 inwardly (as shown dotted in FIG. 2), and decreases the volume of cavity 22 so that liquid ink is expelled out through nozzle portion 26 to form a single drop. Control means 14 provides the voltage control pulses to selectively energize transducer 36 to produce one ink drop for each voltage pulse applied to transducer 36.

Figure 6:
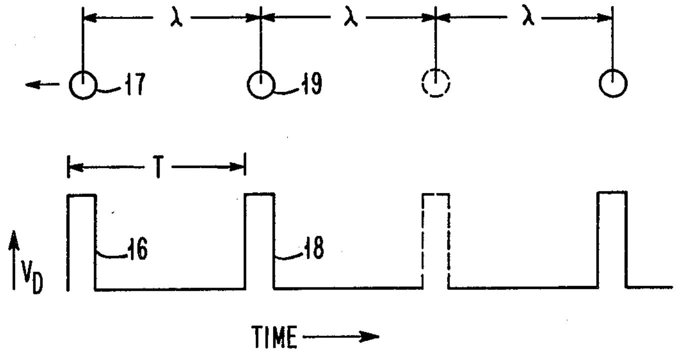
FIG. 6 is a diagram showing the voltage drive pulses for operation in accordance with the present invention.

As shown in FIG. 6, the voltage pulses to selectively energize transducer 36 are formed at equal intervals T so that a maximum drop production rate is established by the repetition frequency (equal to 1/T) of the voltage pulses. The magnitude of the voltage pulses is $V_D$, and this magnitude is substantially lower than that required in prior art drop-on-demand print heads. For example, voltage pulse 16 produces ink drop 17 and the next voltage pulse 18 produces ink drop 19. The spacing $\lambda$ between ink drops 17 and 19 should be constant to produce printed data with acceptable print quality. If it is desired to produce a drop during the next interval T, a voltage pulse (shown dotted in FIG. 6) will be produced to produce a subsequent drop spaced a distance $\lambda$ from drop 19. In the event that the data to be printed requires no drop at that position, then no pulse will be produced. To maintain good print quality, it is required that the missing drop or drops have neglible effect on any other drops produced, either prior to or subsequent to the missing drop or drops.

Figure 2:
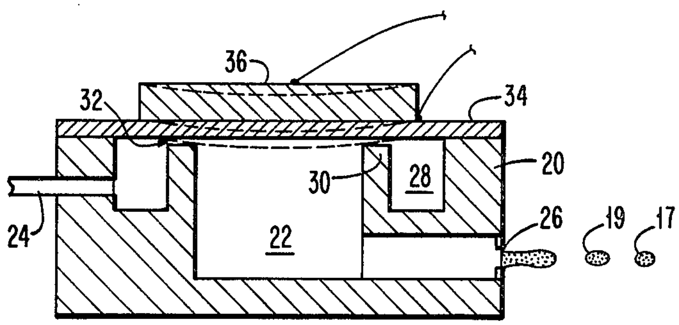
FIG. 2 is a section view taken along line 1—1 of FIG. 1 of the drop-on-demand ink jet print head.

The above described structure operates in a novel manner to dynamically vary the impedance of the upstream supply line during the operation of the print head. When the transducer 36 is energized, membrane 34 bends downward as shown dotted in FIG. 2, decreases the small gap defined by narrow passageway 32, and effectively seals intermediate reservoir 28 from the ink cavity 22. It is not necessary that narrow passageway 32 be completely physically sealed off, since the pressure at that point is changing in proportion to the rate of change of speed or velocity of membrane 34. Since this velocity is changing at a high rate, the gap is effectively sealed off even though it is not physically sealed off. The motion of membrane 34 in FIG. 2 is exaggerated for illustrative purposes, but the actual motion is much less as will be apparent to those skilled in the art. It is apparent that in the "sealed off" position, fluid is ejected only in the forward direction when membrane 34 deflects further. When membrane 34 relaxes, the gap defined by narrow passageway 32 between membrane 34 and internal wall portion 30, opens again and the ink is sucked in from the intermediate reservoir 28 to ink cavity 22. In this phase, the gap defined by narrow passageway 32 serves as an upstream/downstream fluid isolator by means of a viscous damping of any disturbance, but allows fluid to enter cavity 22 with relatively low fluid impedance. Experience has shown that the driving voltage requirement for the dynamic impedance matching head is reduced from that of conventional heads due to its greater efficiency. Furthermore, an extremely stable jet is observed due to reduced wave interactions, decreased upstream influence and increased damping between the ink supply 12 and ink cavity 22. Experience has also shown that the print head can produce drops of constant size and uniform spacing at a much greater asynchronous drop rate than has been possible with prior art print head designs.

Figure 3:
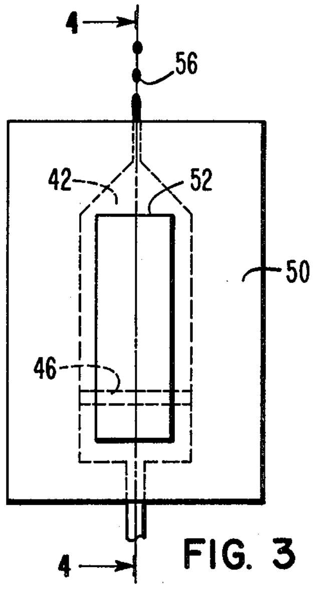
FIG. 3 is a view, partially in section, of an alternate embodiment of a drop-on-demand ink jet print head.
Figure 4:
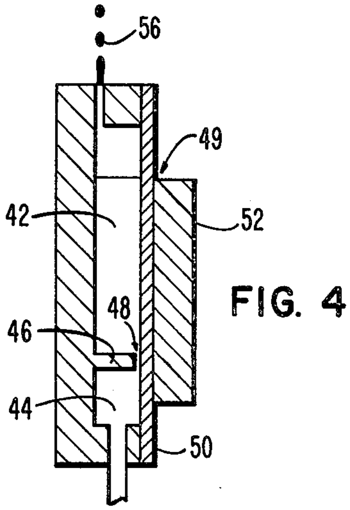
FIG. 4 is a section view taken along lines 4—4 in FIG. 3.

A planar version of the dynamic impedance matching print head design is shown in FIG. 3. In this embodiment, an elongated ink cavity 42 is provided in head body 40. Ink cavity 42 is separated from an intermediate cavity 44 by a cross wall portion 46 that is slightly lower than the surrounding material. Thus, a narrow passageway 48 is formed between cross wall portion 46 and the transducer means 49. Transducer means 49 comprises membrane 50 and electromechanical transducer 52 fixed to the head body 40, so that passageway 48 is formed when the membrane is in a relaxed state, as shown in full line in FIG. 4. Conversely, the gap formed by narrow passageway 48 is decreased and substantially sealed off during the deflection of membrane 50 to produce ink drop 56. Since the fluid impedance in the direction toward the ink supply 12 is increased during the downward motion of membrane 50 and decreased during its relaxation, a dynamic variation of the supply line impedance results with a consequent increase in the performance of the print head in producing ink drops from a drop-on-demand print head.

Figure 5:
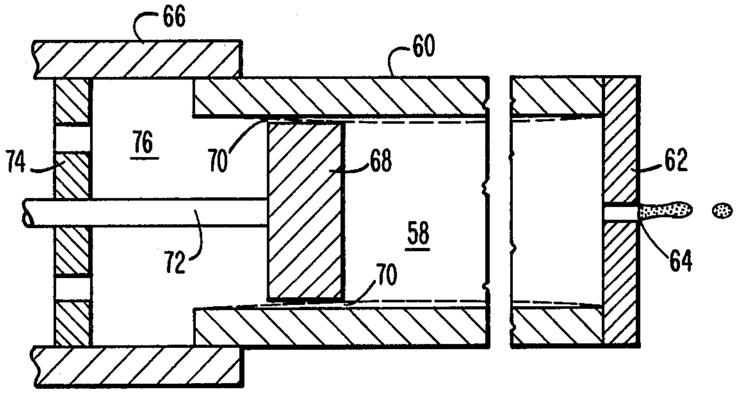
FIG. 5 is a view, partially in section, of a further embodiment of a drop-on-demand ink jet print head.

Another embodiment of the print head which applies the dynamic impedance matching technique to a print head utilizing a radially arranged transducer means is shown in FIG. 5. The print head comprises cylindrical transducer member 60 closed at one end by a nozzle plate 62, having formed therein nozzle portion 64. The other end of the transducer is fixed to body member 66 and intermediate the ends of transducer 60 is a concentrically mounted plug member 68. Plug member 68 is designed so that a narrow passageway 70 is formed between the outer peripheral surface of plug member 68 and the inner face of transducer member 60. Plug member 68 is supported by rod member 72 from support means 74, which is fixed to body member 66. Support means 74 is provided with sufficient openings so that ink freely flows from ink supply means 12 and supply line 24 to intermediate cavity 76. When transducer 60 is actuated by a suitable voltage drive pulse, transducer 60 is deflected to the position shown dotted in FIG. 5 to substantially close off passageway 70 between intermediate cavity 76 and ink cavity 58. Contraction of the volume in ink cavity 58 by energization of transducer 60 causes a single drop of ink 78 to be expelled out through nozzle portion 64. Relaxation of transducer 60 then re-opens passageway 70 to permit ink to flow from intermediate cavity 76 into ink cavity 58.

Thus, it can be seen that time dependent impedance variations in the upstream supply line increases the efficiency and the damping characteristics of drop-on-demand ink jet nozzle designs by closing the supply line during the ejection cycle and opening the supply line to a controlled gap during the refill part of the operational cycle. Embodiments of this design have been described and experience with these embodiments have shown that reduced driving voltages are required due to the increased efficiency. In addition, substantial increases in the drop production rate and increased drop stability have been observed, using the print head with the dynamic impedance adjustment feature as discussed above.

The specific design of the print head can vary widely, based on a number of design considerations and characteristics of the ink being used as known in the art. A specific design built in accordance with the embodiment shown in FIG. 1 had a narrow passageway 32 about 25 micrometers high and a width of internal wall portion 30 of about 250 micrometers. The nozzle diameter was about 50 micrometers. This print head produced a drop rate in binary drop-on-demand operation, i.e., asynchronous operation, which is increased by a factor of more than three above the corresponding drop production frequency achievable with otherwise similar print head designs, but without dynamic impedance matching.

What is claimed is:

1. A drop-on-demand ink jet printing head comprising:

a fluid chamber for receiving ink;

a fluid inlet chamber separated from said fluid chamber by a relatively narrow passageway;

an orifice communicating with said fluid chamber;

a membrane member forming at least part of a wall of said fluid chamber and overlying and adjacent to said fluid inlet chamber said fluid chamber and said relatively narrow passageway; and an electromechanical transducer fixed to said membrane member in a position overlying said narrow passageway, said fluid inlet chamber and said fluid chamber; said electromechanical transducer being selectively actuable in response to electrical signals to provide deflection of the part of said membrane member fixed to said electromechanical transducer to reduce the volume of said fluid chamber and to substantially close, along its entire length, said relatively narrow passageway to force a single drop of ink from said orifice and to substantially close the flow path from said fluid chamber to said fluid inlet chamber during formation of the drop of ink.

2. The drop-on-demand ink jet printing head of claim 1 wherein said fluid inlet chamber comprises a shallow radial trough surrounding said fluid chamber.

3. The drop-on-demand ink jet printing head of claim 2 wherein said relatively narrow passageway comprises a gap of about 25 micrometers.

4. The drop-on-demand ink jet printing head of claim 1 wherein said fluid chamber is elongated and said fluid inlet chamber is formed by a cross-wall member extending across said fluid chamber.

5. A drop-on-demand ink jet printing head comprising:

a fluid chamber for receiving ink;

a fluid inlet chamber separated from said fluid chamber by a wall portion;

an orifice communicating with said fluid chamber;

a membrane member mounted adjacent said fluid inlet chamber and said fluid chamber so that a relatively narrow passageway is formed between said membrane member and said wall portion;

an electromechanical transducer fixed to said membrane member in a position overlying said relatively narrow passageway, said fluid inlet chamber and said fluid chamber; and a source of electrical signals and means to selectively actuate said electromechanical transducer in response to said electrical signals to provide deflection of the part of said membrane member fixed to said electromechanical transducer to reduce the volume of said fluid chamber and to substantially close, along its entire length, said relatively narrow passageway to force a single drop of ink from said orifice and to substantially close the flow path from said fluid chamber to said fluid inlet chamber during formation of the drop of ink.

6. The drop-on-demand ink jet printing head of claim 5 wherein said fluid inlet chamber comprises a shallow radial trough surrounding said fluid chamber.

7. The drop-on-demand ink jet printing head of claim 6 wherein said relatively narrow passageway comprises a gap of about 25 micrometers.

8. The drop on demand ink jet printing head of claim 5 wherein said fluid chamber is elongated and said fluid inlet chamber is formed by a cross-wall member extending across said fluid chamber.

9. A drop-on-demand ink jet printing head comprising:

transducer means comprising an elongated hollow cylindrical member;

orifice means fixed to one end of said transducer means for substantially closing one end of said transducer means;

cylindrical body means and means to fix said cylindrical body means to the other end of said transducer means;

means for supplying ink to the hollow interior of said transducer means and said cylindrical body member;

a solid cylindrical member having an outer diameter less than the inner diameter of said transducer means;

means for supporting said cylindrical member in a fixed position radially, intermediate the supported one and other ends of said transducer means to form a relatively narrow passageway between the inner diameter of said transducer means and the outer diameter of said cylindrical member;

a source of electrical signals and means to selectively actuate said transducer means in response to said electrical signals to provide inward radial deflection of said transducer to reduce the volume in said hollow interior of said transducer means and to substantially close said relatively narrow passageway to force a single drop of ink from said orifice and to substantially close the flow path from said hollow interior portion to said means for supplying ink during formation of the drop of ink.

* * * * *